(12) United States Patent  
Zad-Issa et al.

(10) Patent No.: US 9,124,708 B2  
(45) Date of Patent: Sep. 1, 2015

(54) FAR-END SOUND QUALITY INDICATION FOR TELEPHONE DEVICES

(75) Inventors: Mohammad Reza Zad-Issa, Irvine, CA (US); Elias Nemer, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 1845 days.

(21) Appl. No.: 12/181,111

(22) Filed: Jul. 28, 2008

(65) Prior Publication Data

US 2010/0020940 A1 Jan. 28, 2010

(51) Int. Cl.  
H04M 9/00 (2006.01)  
H04M 1/60 (2006.01)  
H04M 9/08 (2006.01)  
H04M 1/24 (2006.01)  
H04M 1/58 (2006.01)

(52) U.S. Cl.  
CPC .............. *H04M 1/6016* (2013.01); *H04M 9/08* (2013.01); *H04M 1/24* (2013.01); *H04M 1/585* (2013.01)

(58) Field of Classification Search  
CPC .......... H04R 3/005; H04R 1/406; H04R 3/02; H04R 1/1008; H04R 1/2819; H04M 1/6016; H04M 9/082; H04M 11/066; H04M 1/2155; H04M 1/58; H04M 3/36; H04M 1/585; H04M 1/60; H04M 1/6033; H04M 9/08; H04M 11/06; G10L 15/065; G10L 21/0208; G10L 2021/02082; G10L 21/02; G10L 15/20; G10L 15/265; Y10S 367/901; H04B 3/23

USPC .............. 379/22.08, 32.01, 397.01, 391, 392, 379/444, 395, 390.03, 390.01, 392.01, 379/406.01, 406.09, 387.01, 388.01, 379/406.06, 406.08, 93.37; 381/371.11, 381/345; 704/233, 226, 275

See application file for complete search history.

(56) References Cited

U.S. PATENT DOCUMENTS

| | | | | |
|---|---|---|---|---|
| 4,985,925 A * | 1/1991 | Langberg et al. | ............ | 381/71.6 |
| 5,640,450 A * | 6/1997 | Watanabe | ...................... | 379/392 |
| 5,864,799 A * | 1/1999 | Corretjer et al. | ............... | 704/228 |
| 6,389,111 B1 * | 5/2002 | Hollier et al. | .................... | 379/28 |
| 6,820,054 B2 * | 11/2004 | Erell et al. | ..................... | 704/233 |
| 6,941,161 B1 * | 9/2005 | Bobisuthi et al. | .......... | 455/569.1 |
| 8,630,685 B2 * | 1/2014 | Schrage | ........................ | 455/570 |
| 2004/0059578 A1 * | 3/2004 | Schulz et al. | ................. | 704/270 |
| 2004/0162722 A1 * | 8/2004 | Rex et al. | ....................... | 704/211 |
| 2008/0043931 A1 * | 2/2008 | Steele et al. | ............... | 379/27.03 |

* cited by examiner

*Primary Examiner* — Akelaw Teshale  
(74) *Attorney, Agent, or Firm* — McDermott Will & Emery LLP

(57) ABSTRACT

A sound quality metric may be determined at a near-end telephone system, the sound quality metric associated with far-end sound quality received at a far-end telephone system. A signal adjustment may be determined, based on the sound quality metric. The signal adjustment may thus be provided at an earpiece of the near-end telephone system. In this way, a user of the near-end telephone system may be alerted that the sound quality of a far-end user is unacceptably low, so that the near-end user may take corrective action at the near end to improve the far-end sound quality.

20 Claims, 6 Drawing Sheets

FAR-END SOUND QUALITY INDICATION FOR TELEPHONE DEVICES

TECHNICAL FIELD

This description relates to improving telephone sound quality.

BACKGROUND

Far-end sound quality refers to an experience of a telephone user who is receiving speech or other audio from a near end speaker or other provider of the audio. For example, in a typical scenario, a near-end user may speak into a mobile phone or other telephone-related device, while a far-end user may receive and listen to the speech of the near-end user. Of course, these roles typically reverse and alternate during a normal telephone conversation.

From the perspective of a given far-end user, there are a number of factors on the side of the near-end user which may affect the received sound quality as experienced by the far-end user. For example, the near-end user may be speaking in a noisy environment, such as when wind or other background sounds are present in a vicinity of the near-end user. As another example, the near-end user may speak too softly or too far from the near-end user's mouthpiece for the far-end user to easily hear and understand a speech of the near-end user. In another example, the telephone of the near end user may experience a malfunction of some sort that may be heard by the far-end user but not by the near-end user, or the telephone of the near-end user may cause an echo to be experienced by the far-end user.

When the far-end user experiences such reductions in sound quality, it may become uncomfortable, difficult, and/or impossible for the far-end user to continue a conversation or other exchange of information. Consequently, an enjoyment of the users and a utility of the telephone(s) may be diminished.

SUMMARY

The details of one or more implementations are set forth in the accompanying drawings and the description below. Other features will be apparent from the description and drawings, and from the claims.

DETAILED DESCRIPTION

Figure 1:
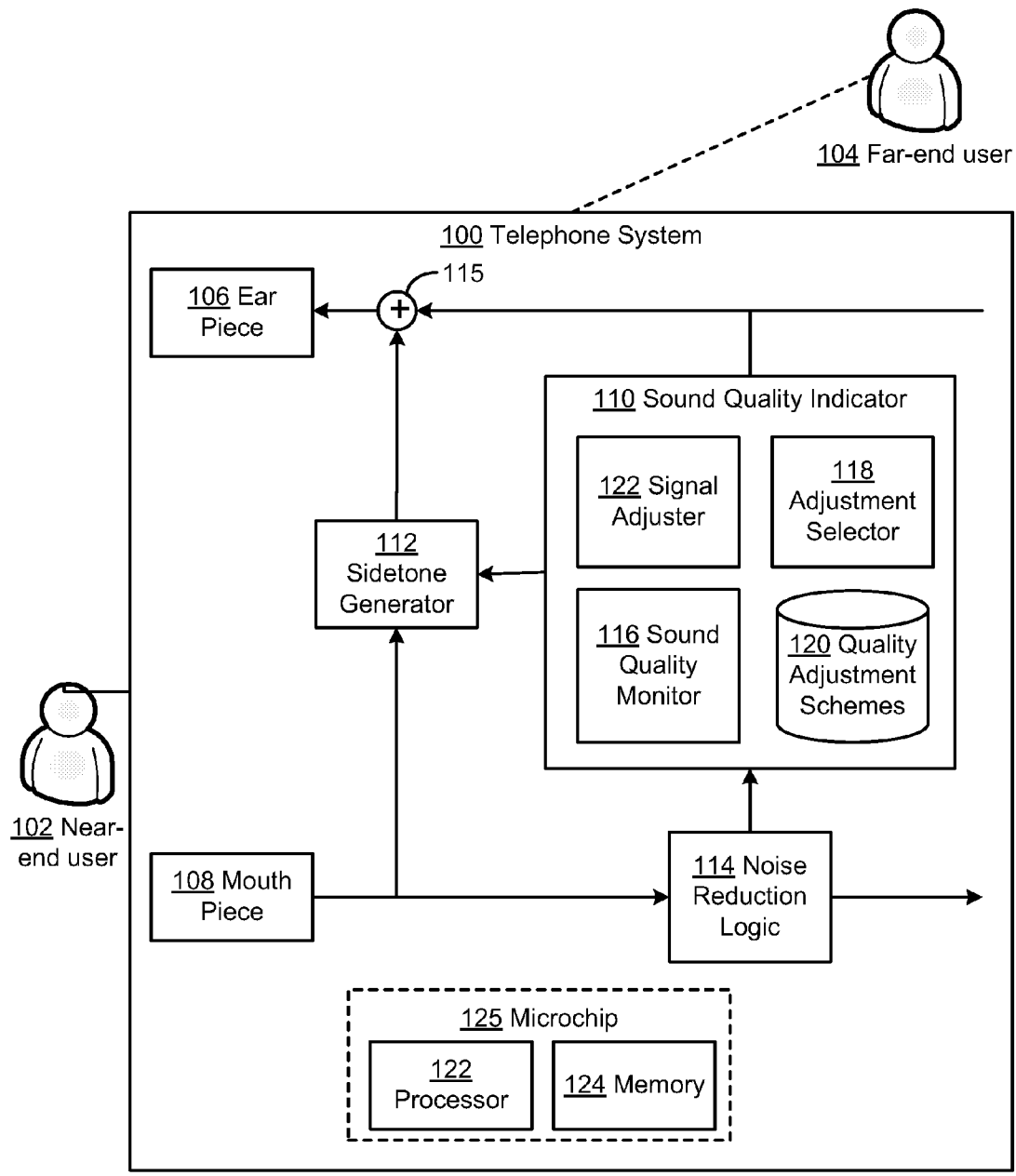
FIG. 1 is a block diagram of a telephone system for providing a far-end sound quality indication.

FIG. 1 is a block diagram of a telephone system 100 for providing a far-end sound quality indication to a near-end user 102. By providing the far-end sound quality indication, the telephone system 100 provides the near-end user 102 an opportunity to take corrective action to improve the problem(s) leading to the problematic far-end sound quality, so that an experience of a far-end user 104 may be improved. In this way, the enjoyment and utility of the telephone system 100 may be improved.

For example, the near-end user 102 of the telephone system 100 may be using a mobile phone and may be speaking in the presence of wind or other background noise, which may lead to a reduced sound quality experienced by the far-end user 104. The telephone system 100 may then provide an indication of the reduced far-end sound quality to the near-end user 102, whereupon the near-end user 102 may, for example, move into a quieter environment or otherwise reduce an effect of the wind on the operation of the telephone system 100. In this way, an experience of the far-end user 104 may be improved.

In the example of FIG. 1, the telephone system 100 may represent a system to be used in conjunction with virtually any telephone or telephone-type device(s). For example, the telephone system 100 may represent (or be used with) a cell phone or mobile phone, a personal digital assistant (PDA) with telephone capability, a Voice Over Internet Protocol (VOIP) telephone, or a landline (Plain Old Telephone System (POTS)) telephone. The telephone system 100 also may represent a laptop or other personal computer or computing device with telephone capability.

The telephone system 100 may generally provide for an exchange of audio information between the users 102, 104 as described herein, and/or may provide additional functionality, such as, for example, video telephony. For the sake of clarity and conciseness, FIG. 1 does not explicitly illustrate all such functionality and features, nor does FIG. 1 explicitly illustrate certain conventional components necessary or useful to the operation of the telephone system 100 (such as, for example, batteries or other power sources, antennas or other equipment for transmitting/receiving telephone signals, or, as another example(s), the analog-to-digital (ADC) and digital-to-analog (DAC) converters illustrated below in FIG. 3).

The telephone system 100 may include an earpiece 106 and a mouthpiece 108. The earpiece 106 may represent a portion of the telephone system 100 that may be held to an ear of the near-end user 102, such as when the telephone system 100 represents a cell phone. More generally, the earpiece 106 may include any speaker/transducer that is configured to receive a signal from the far-end user 104 and convert the signal into an audio signal for the near-end user 102. Similarly, the mouthpiece 108 may represent a conventional mouthpiece of a cell phone or other telephone, or may represent any microphone/transducer for converting voice or other audio signals of the near-end user 102 into electrical signals for transmission to the far-end user 104. Thus, the earpiece 106 and the mouthpiece 108 may be incorporated into a handset, headset, earpiece (ear-held device), speakerphone, computing device, monitor or other video device, or any other suitable device(s), as would be apparent.

In FIG. 1, as the near-end user 102 speaks into the mouthpiece 106, a sound quality indicator 110 may be operable to determine one or more quality metrics which are determined to potentially affect a sound quality experienced by the far-end user 104. The sound quality indicator 110 may then output a sound adjustment to the earpiece 106, which may be audible to, and detected by, the near-end user 102. In this way, the near-end user 102 may be made aware of a type and/or extent of the affected sound quality experienced by the far-end user 104, and may take appropriate corrective action, accordingly.

In some implementations, the sound quality indicator 110 may work in conjunction with a sidetone generator 112. The sidetone generator 112 provides a conventional functionality/feature known as sidetone, in which, e.g., during a normal operation of the telephone system without any (or independent of) diminished far-end sound quality, a part of a speech of the near-end user 102 is fed back from the mouthpiece 108 to the ear piece 106.

This technique reflects the normal human experience of hearing one's own voice while speaking. Thus, such a sidetone may conventionally be provided for a use, comfort, and convenience of the near-end user 102, e.g., to let the near-end user 102 know that the telephone system 100 is operational. For example, with no sidetone, the near-end user 102 may not hear his or her own voice well enough at the ear piece 106, and may consciously or unconsciously speak too loudly or shout into the mouthpiece 108, or may feel the telephone system 100 is broken or otherwise unsuitable.

Additional conventional features of sidetone are known and/or are described herein. In FIG. 1, the sound quality indicator 110 may act to leverage an operation of the sidetone generator 112 in providing the far-end sound quality indication, e.g., may modify the sidetone signal(s) to reflect the far-end sound quality indication as well. For example, conventional sidetone is audible to the near-end user 102 at the earpiece 106, at a low level at which the near-end user 102 may not even be consciously aware of the sidetone. In contrast, in example implementations, the far-end sound quality indication may purposefully be at a sound level high enough to attract an attention or awareness of the near-end user 102, so that the near-end user 102 will be prompted to take corrective action.

For example, if the telephone system 100 is a mobile phone, the near-end user 102 may be speaking indoors and may experience normal sidetone from the sidetone generator 112. If the near-end user 102 walks outside while talking and wind is present, then the far-end user 104 may suddenly experience diminished sound quality, while (in conventional systems) the near-end user 102 may be unaware of the effect on the far-end user 104. In the example implementations of FIG. 1, however, the sound quality indicator 110 may modify the sidetone from the sidetone generator 112 so that the near-end user 102 experiences a noticeable and uncomfortable audible tone or other indicator at the earpiece 106. Consequently, for example, the near-end user 102 may be prompted to step back indoors to finish the conversation, or may cover the mouthpiece to reduce an amount of wind detected therewith.

In this regard, it may be appreciated that the telephone system 100 may include some type(s) of noise reduction logic 114. Numerous types of such noise reduction logic exist (examples are provided below) and may be used in the telephone system 100. Practically speaking, however, noise reduction techniques have limits to their ability to reduce noise. For example, even if the noise reduction logic 114 is configured to reduce an effect of wind noise at the near end as experienced by the far-end user 104, there is an amount of wind that will nonetheless cause diminished sound quality for the far-end user 104. Further, even if the noise reduction logic 114 is configured to be very effective and efficient at reducing wind noise, the result may be that greater processing and power resources are required by the noise reduction logic 114, and/or that the noise reduction logic 114 is less effective in reducing other amounts of noise (e.g., other background noise, such as cars or other persons speaking). In short, implementation of the noise reduction logic 114 may involve many of the typical engineering cost/benefit trade-offs faced by system designers.

As just referenced, the noise reduction logic 114 may employ a wide range of strategies for reducing virtually any type of noise, including wind noise, background talking of other persons in the area, background automobile noise, and various other types of noise. Some examples of possible strategies include variants of spectral subtraction, signal separation techniques (e.g., Independent Component Analysis (ICA) and variants), post-filtering, and beamforming.

It may be appreciated that these techniques generally rely on some form of speech versus noise detection/measurement, assumptions about number or type of noise sources, and assumptions about statistics of the speech and/or noise sources. From a practical standpoint, these techniques are limited by their respective operating ranges, adaptation/learning times, and potential speech distortion (e.g., when executing outside of the operating range, or if the various assumptions above are invalid to some extent). Further, these techniques are associated with a computational and power cost to obtain improved performance. That is, performance of the noise reduction logic 114 may be improved by reducing the amount of noise, relative to the level of speech. That is, reducing the noise allows the various noise reduction algorithms/techniques to achieve the same amount of noise reduction for lesser amounts of the computational/power cost(s), and reduces the chances of distorting the speech of the near-end user 102.

Consequently, instead of (or in addition to) seeking to improve an efficacy of the noise reduction logic 114, the telephone system 100 seeks to employ the near-end user 102 to reduce the noise effect or otherwise mitigate or ameliorate a cause of diminished sound quality experienced by the far-end user 104. For example, in the example of wind noise, a sound quality indication provided at the ear piece 106 may indicate to the near-end user 102 that wind noise or other background noise (or other cause entirely, as described herein) may prompt the near-end user 102 to take appropriate steps, such as, for example, moving indoors, speaking more loudly, or covering the mouthpiece 108 to block the background noise.

Thus, in FIG. 1, an adder 115 is used to combine the sidetone from the sidetone generator 112 and the sound quality indication from the sound quality indicator 110. For example, as described herein, the sound quality indicator 110 may use a time-varying filter and/or level adjuster to affect the sidetone from the sidetone generator 112 and thus affect a received signal as experienced through the earpiece 106. In other example implementations, the sound quality indicator 110 may output a signal that is added to the sidetone and to the received signal. In other implementations, the sidetone generator 112 may be omitted entirely or operated independently of the sound quality indicator 110, which may then directly modify the received signal from the far-end user 104. In yet other example implementations, the sound quality indication system 110 may be implemented as part of the sidetone generator 112.

In operation, the sound quality indicator 110 may include components that are illustrated in FIG. 1 as a sound quality monitor 116, an adjustment selector 118, a memory 120 that stores quality adjustment schemes or rules, and a signal adjuster 122. As will be appreciated, these components are merely examples of components which perform some of the functions described, and additional or alternative components may be used, as well.

The sound quality monitor 116 refers to any detection logic for determining whether a factor is occurring at the near end which may affect sound quality at the far end. Some examples that have already been provided include wind or other background noise, a malfunction of the telephone system 100, or a tendency of the near-end user 102 to speak too softly or too far from the mouthpiece 108. The sound quality monitor 116 may determine sound quality metrics which provide a quantitative measure of the potential far-end sound quality issues.

Depending on the type of issue which may be affecting the far-end sound quality, the sound quality monitor 116 may operate substantially independently (e.g., may be specifically installed in the telephone system 100 to perform its given function(s)) or may leverage and use information that is already available within the telephone system 100. In the latter case, in the examples provided herein, the sound quality monitor 116 may use information available from the noise reduction logic 114, or from other components which process audio from the mouthpiece 108 for transmission to the far-end user 104, as described herein.

As a general example, the noise reduction logic 114 may typically calculate a measure of distortion in a signal received from the mouthpiece 108, e.g., relative to a level or quality of signals attributable to a voice of the near-end user 102. For example, a given level of noise/distortion may be acceptable if the near-end user 102 tends to speak loudly (and thus tends to drown out the noise/distortion), but may be unacceptable (and may require noise reduction attempts by the noise reduction logic 114) if the near-end user 102 tends to speak more softly. The sound quality monitor 116 may thus interact with the noise reduction logic 114 to obtain sound quality metrics that are already being used by the noise reduction logic to perform noise reduction (i.e., for simultaneous use by the sound quality indicator 110).

Figure 4:
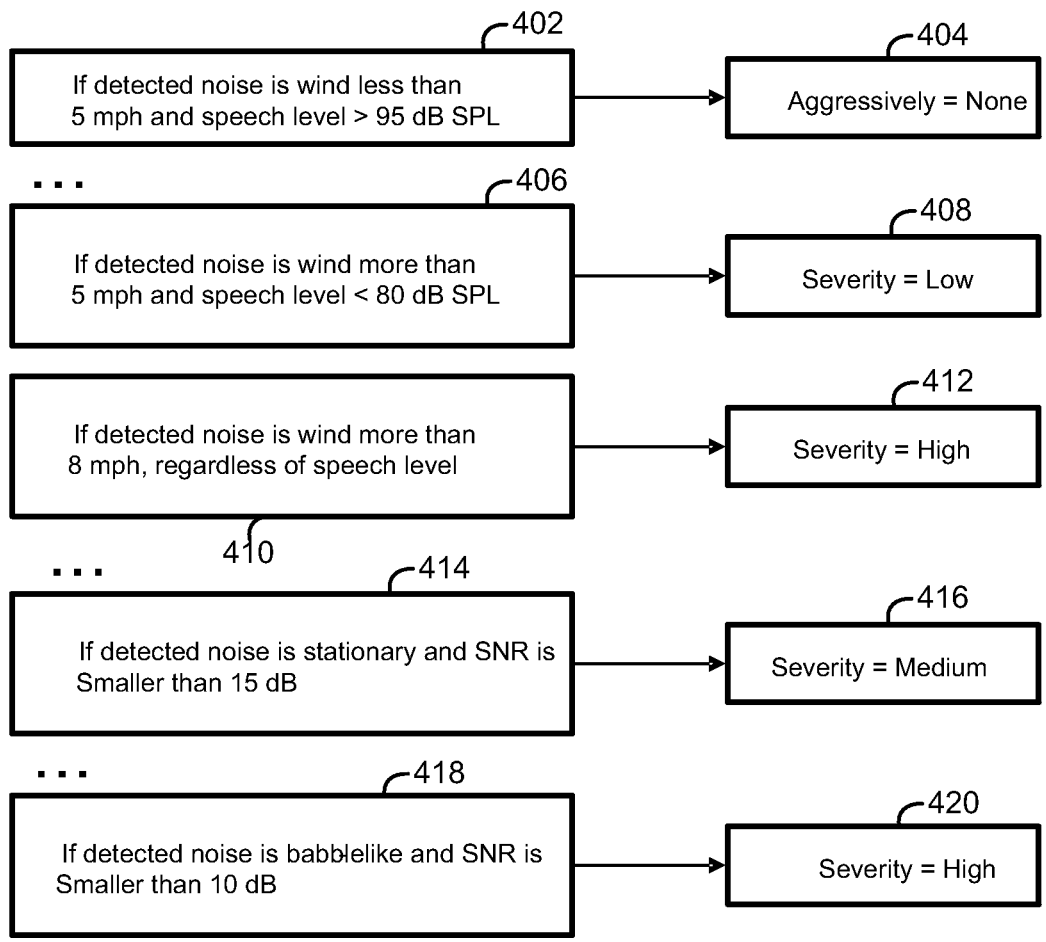
FIG. 4 is a block diagram of example operations of a sound quality adjustment selector of the systems of FIGS. 1 and 3.

An adjustment selector 118 may receive the sound quality metrics from the sound quality monitor 116 for use in determining one or more techniques for providing the sound quality indication signal at the earpiece 106. In so doing, in some example implementations, the adjustment selector 118 may consult a memory 120 storing known quality adjustment schemes. For example, as referenced above, there may be a number of factors which affect a type or extent of the sound quality indication signal (FIG. 4 provides examples of such considerations that may be used to determine whether, how, and to what extent the signal adjuster 122 should provide the sound quality indication signal to the earpiece 106). The sound quality adjustment schemes 120 may store a number of solutions that are pre-configured to correspond to certain (combinations of) sound quality metrics that may be determined by the sound quality monitor 116 and received at the sound quality adjustment selector 118.

In this way, the adjustment selector 118 may determine an appropriate scheme for use in instructing the signal adjuster 122 to adjust the signal received at the earpiece 106, perhaps in combination with the sidetone generator 112. For example, the adjustment selector 118 may determine a type or extent of level adjustment, or may determine filter parameters (e.g., coefficients), or other inputs or characteristics of the signal adjuster 122, examples of which are described, for example, with reference to FIG. 5.

Thus, in the examples above and in other examples, some of which are described herein, the sound quality indicator 110 may provide a sound adjustment at the earpiece 106 when the sound quality indicator 110 determines that there may be a diminished sound quality experienced by the far-end user 104. In this way, the near-end user 102 may be made aware of the potential diminished sound quality at the far end, and may take corrective action or otherwise respond to improve an experience of the far-end user 104 (e.g., may switch to another phone or agree to continue the call at a different time/place).

Finally, FIG. 1 also illustrates a processor 122 and memory 124, in order to explicitly illustrate that portions of the telephone system 100 may be implemented as software or firmware, e.g., as computer-implementable instructions stored in the memory 124 or other computer-readable medium and read into the processor 122 for execution therewith. It will be appreciated that one or both of the processor 122 and memory 124 may be implemented using any standard form or component(s) available in the art, such as, for example, as part of a microchip(s) 125. It may be appreciated that components of the telephone system 100 described herein, as well as associated program code and algorithms for implementing the telephone system 100, may cause the general-purpose processor 122, memory 124, and microchip 125 into special-purpose components or other circuitry for implementing the various embodiments described herein, as well as other embodiments, as would be apparent.

Figure 2:
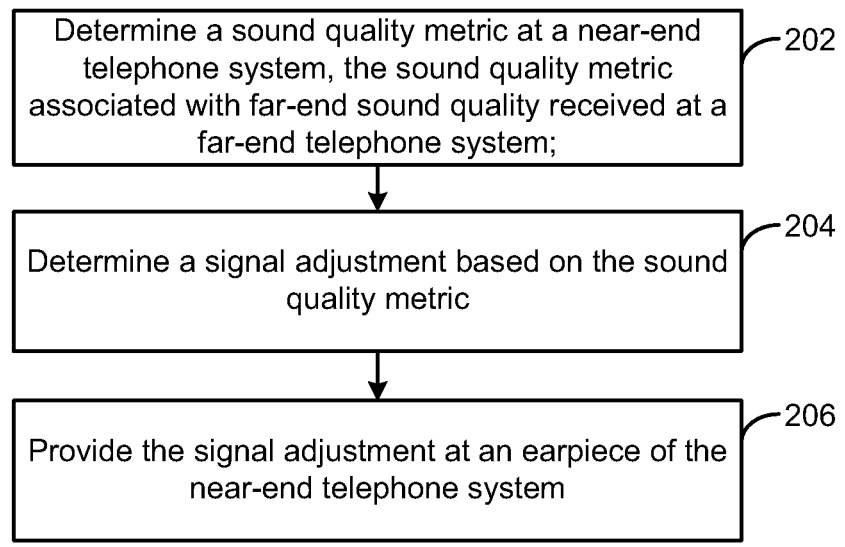
FIG. 2 is a flowchart illustrating example operations of the system of FIG. 1.

FIG. 2 is a flowchart 200 illustrating example operations of the system 100 of FIG. 1. In the example of FIG. 2, a sound quality metric is determined at a near-end telephone system, the sound quality metric associated with far-end sound quality received at a far-end telephone system (202). For example, as described, the sound quality monitor 116 may determine such a sound quality metric, such as, for example, a measure of wind-caused distortion relative to a signal strength of a voice received from the mouthpiece 108. The sound quality monitor 116 may determine a type or extent of the sound quality metric, perhaps using known components in the noise-reduction logic 114.

It will be appreciated from the description herein that the term sound quality metric in this context may include a reference to a potential sound quality inadequacy at the far-end. That is, while a reduced near-end sound phenomenon (e.g., wind noise) may be contemplated here and may be associated with the sound quality inadequacy at the far-end, it is also true that the sound quality monitor 116 may measure other sound quality metrics, including, e.g., potential hardware malfunctions or inadequacies.

A signal adjustment may be determined based on the sound quality metric (204). For example, the adjustment selector 118 may receive the sound quality metric(s) from the sound quality monitor 116, and may access adjustment selection schemes 120 based thereon in order to determine potential signal adjustments or signal adjustment features/characteristics. For example, a number of variables may be at play in a given situation, such as a voice level of the near-end user 102, a distortion level that is present (e.g., a level of wind noise), and an efficacy of the noise reduction logic 114. Different adjustment selection schemes (stored in the adjustment selection schemes 120) may be more suitable than others depending on these circumstances, and the adjustment selector 118 may select from among these, based in part on the sound quality metric(s). In other implementations, the adjustment selector 118 may implement one or more algorithms to determine the signal adjustment for providing to the signal adjuster 122.

Thus, the signal adjustment may be provided at an earpiece of the near-end telephone system (206). For example, the signal adjuster 122 may be configured to filter, level adjust, or otherwise alter or modify the signal received at the earpiece 106, based on the signal adjustment information provided by the signal adjustment selector 118. In this way, the near-end user 102 may become aware of potential sound quality difficulties being experienced by the far-end user 104, and may take corrective action accordingly.

In example implementations, the signal provided at the earpiece 106 may be added to, or produced in conjunction with, a sidetone from the sidetone generator 112. In these and other implementations, the sound quality indicator 110 may provide a buzz, hum, or other audible background noise at the earpiece 106 to indicate the potential far-end sound quality problem. The sound quality indicator 110 may vary a volume of the audible background noise in direct proportion to an extent of the potential far-end sound quality problem (e.g., more wind noise results in a larger background noise provided at the earpiece 106).

In some implementations, the sound quality indicator 110 may provide the signal adjustment in a manner that is designed to be intuitive to the near-end user 102 in interpreting the need to take corrective action. For example, the sound quality indicator 110 may provide a noise that sounds like wind noise at the earpiece 106, so the near-end user 102 may instinctively move to a less windy location (similarly for other types of background noise). Similarly, if the near-end user 102 speaks too softly or holds the mouthpiece too far from his/her mouth, then, the sound quality indicator 110 may lower a volume at the earpiece 106, so that the near-end user 102 may instinctively speak louder.

In other example implementations, the sound quality indicator 110 may provide more explicit indications of far-end sound quality problems. For example, the near-end user 102 may be provided with instructions which define a set of signal adjustments (e.g., background noise(s)) and a correlation between the signal adjustments and potential causes of background noise. For example, wind noise may produce a beep, while speaking too softly may result in a buzz or other indicator. In still other examples, the sound quality indicator 110 may provide a spoken indication such as a pre-recorded message of "wind noise is present," or "severe wind noise is present."

Figure 3:
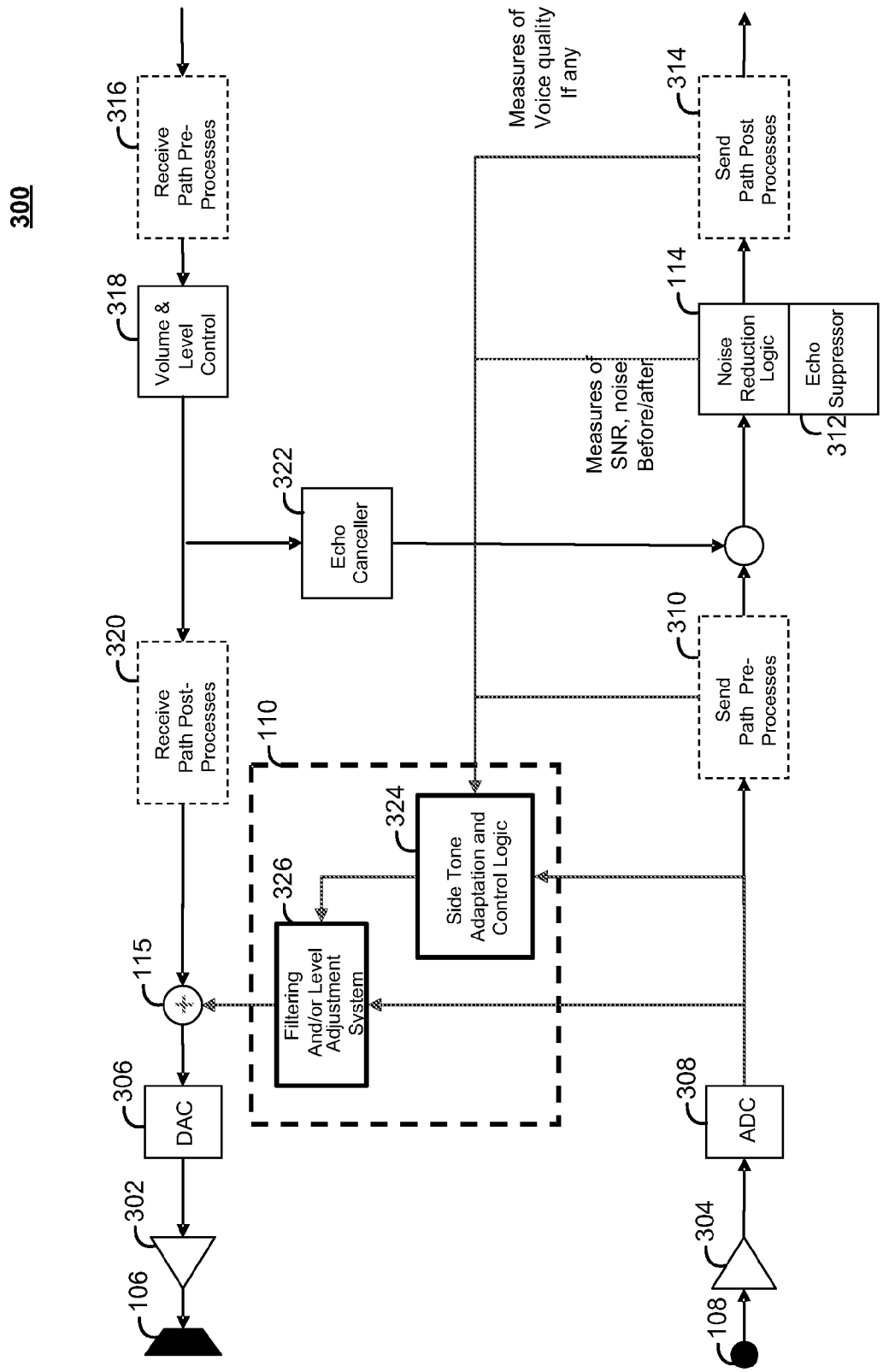
FIG. 3 is a block diagram of a more detailed example implementation of the system of FIG. 1.

FIG. 3 is a block diagram 300 of a more detailed example implementation of the system of FIG. 1. In FIG. 3, amplifiers 302, 304 receive/output signals from/to analog/digital converters 306/308. That is, as shown, the amplifier 304 amplifies an analog signal received from the mouthpiece 108 for conversion to a digital signal by the analog-to-digital (ADC) converter 308. Meanwhile, the amplifier 302 amplifies a received analog signal received from the digital-to-analog (DAC) 306 for output to the earpiece 106.

FIG. 3 further illustrates, to varying levels of detail and specificity, relevant features of the implementation 300, including example sources of input for the sound quality indicator 110, e.g., information which may be used by the sound quality monitor 116 and/or the adjustment selector 118. To the extent that such components include standard components and functionality, such components may only be described in enough detail to ensure appropriate operation of the sound quality indicator 110.

For example, send path pre-processes 310 and send path post-processes 314 may refer to various operations performed on the signal to be sent to the far-end user 104 as received from the mouthpiece 108, before or after operations performed by the noise reduction logic 114, an echo suppressor 312, or an echo canceller 322, as shown. Known examples of such processes include voice encoding, comfort noise generation, automatic gain control, microphone equalization, rate adaptation, various types of filtering, and, when a second microphone is present at the mouthpiece 108, beamforming. These processes may be discussed in more detail below in the context of their use by the sound quality monitor 116 (understood in FIG. 3 to be implemented as detection logic within sidetone adaptation and control logic 324).

Meanwhile, receive path pre-processes 316 and receive path post-processes 320 may include, for example, operations performed before and after volume/level control 318, such as, for example, voice decoding, packet loss concealment, noise reduction, various types of filtering, automatic gain control, speaker equalization, noise dependent equalization, and rate adaptation. Again, these and other related techniques are generally known and/or are discussed in detail below to the extent used by the sound quality indicator 110.

One operation performed on the send side relates to the activity of voice activity detection (VAD), i.e., the detection/labeling of portions of the send signal as either speech or noise. VAD typically includes estimation of a signal-to-noise ratio (SNR), i.e., a difference between the estimated level of speech and the estimated level of noise. The SNR may be a single value (averaged over the whole spectrum) or may be represented as an array, where each element corresponds to a frequency range.

As part of VAD, various metrics may be determined, including zero-crossings of the send signal, pitch measurements, spectral envelope(s). In normal operation of VAD, these metrics, or combinations thereof, may be compared to one or more thresholds to distinguish between speech/voice and noise, by, for example and as referenced above, determining a signal to noise ratio. In the telephone system 300, these sound quality metrics also may be detected and used by the sound quality indicator 110, as described herein.

Further, the noise reduction logic 114 may implement noise reduction, including wind noise detection, using these and other sound quality metrics. For example, wind noise detection may include determination of a number and location of certain frequency bands, a determination of a prediction gain to exploit a non-white structure of the wind noise, an autocorrelation (in time) of frequency bins to differentiate the wind noise from the steady harmonic energy of speech, ratios of frequency band energies to detect decreasing energy with frequency, statistical measures of likelihood of speech, and pitch variances to detect abrupt changes in pitch values. Once wind noise is detected, a suppression strategy such as a high pass filter may be used to remove or mitigate the wind noise (which is typically in relatively low parts of the spectrum).

In the example implementation of FIG. 3, the sound quality indicator 110 implements the various functionalities of the sidetone generator 112, the sound quality monitor 116, the adjustment selector 118, and the signal adjuster 122 are illustrated as being implemented by side tone adaptation and control logic 324 and filtering and/or level adjustment system 326. Specifically, the sound quality indicator 110 may include the sidetone adaptation and control logic 324 that is configured to reuse and/or compute a relative level or type of distortion in the signal received from the mouthpiece 108 (i.e., from the ADC 308), and the filtering and/or level adjustment system 326 that is configured to determine a level and/or spectral shape of a sidetone signal to be applied to the signal input to the earpiece 106 (i.e., to the DAC 306).

In more specific examples, the sidetone adaptation and control logic 324 may track a noise level, a SNR measure or estimate, voice activity detection or any speech/noise detection, and/or a quality/efficacy of noise reduction performed by the noise reduction logic 114. The sidetone adaptation and control logic 324 may thus link one or more of these sound quality metrics (or other sound quality metrics) with a gain/spectral shape metric to be used in adjusting the signal provided to the earpiece 106.

For example, in tracking noise level, the sidetone adaptation and control logic 324 may simply utilize information that is already present from, or used by, the noise reduction logic 114, such as the voice activity detector. In particular, algorithms associated with these functionalities may use an estimate of noise (e.g., as a function of frequency), which may be expressed in decibels (dB).

As referenced, some conventional noise reduction algorithms have an operating range defined in terms of input signal and noise levels, as well as type of noise. For instance, associated algorithms may quantify performance during development and testing stages by specifying potential noise reduction that may be obtained in a particular setting. For example, a first type of noise with an associated SNR in a first range may yield a first dB level of SNR improvement while maintaining good speech quality, while in the same situation a larger SNR improvement may be obtained by sacrificing some level of speech quality. Thus, the noise reduction logic 114 may estimate its own performance, e.g., with respect to noise reduction and quantity of distortion that may be added to the speech while maintaining acceptable speech quality.

The filtering and/or level control system 326 thus may reference virtually any filter and/or level adjuster in which cutoff frequencies (or other filter parameters) and gain control may be controlled by an external logic. With the system 326, then, an appropriate level of severity may be selected, where severity in this context refers generally to an extent to which the sidetone adaptation and control logic 324 may instruct the filtering and/or level adjustment system 326 in modifying the sidetone provided to the near-end user 102. For example, a high severity (i.e., very noticeable to the near-end user 102) may be associated with a gain of approximately –12 dB, while a medium severity may be associated with –16 dB, a low severity with a gain of –20 dB and no effective impact on severity may be obtained with a very low gain such as –70 dB (or simply by zero output from the filter and/or level adjustment system 326).

FIG. 4 provides examples of situations in which these different levels of severity may be selected and used. In this sense, and with reference to FIG. 1, it will be appreciated that FIG. 4 may be considered to provide example operations of the sound quality adjustment selector 118 of the system of FIG. 1, which is implicit within the sidetone adaptation and control logic 324 of FIG. 3.

As shown in FIG. 4, if a wind noise is detected which is less than 5 mph and speech level is greater than 95 dB (402), then no sidetone adaptation may be necessary (404). In another example, if wind noise is detected which is greater than 5 mph and speech level is less than 80 dB (406), then a severity may be low (408). If wind noise is detected as being greater than 8 mph (410), then, regardless of speech level, severity may be selected to be high (412). In yet another example, if detected noise is categorized as stationary (such as a parked car that is on and idling) and SNR is less than 15 dB (414), then a severity may be medium (416). Finally, if detected noise is characterized as "babblelike" (meaning relatively large number of variations in time and frequency) and SNR is less than 10 dB (418), then a severity may be high (420).

Figure 5:
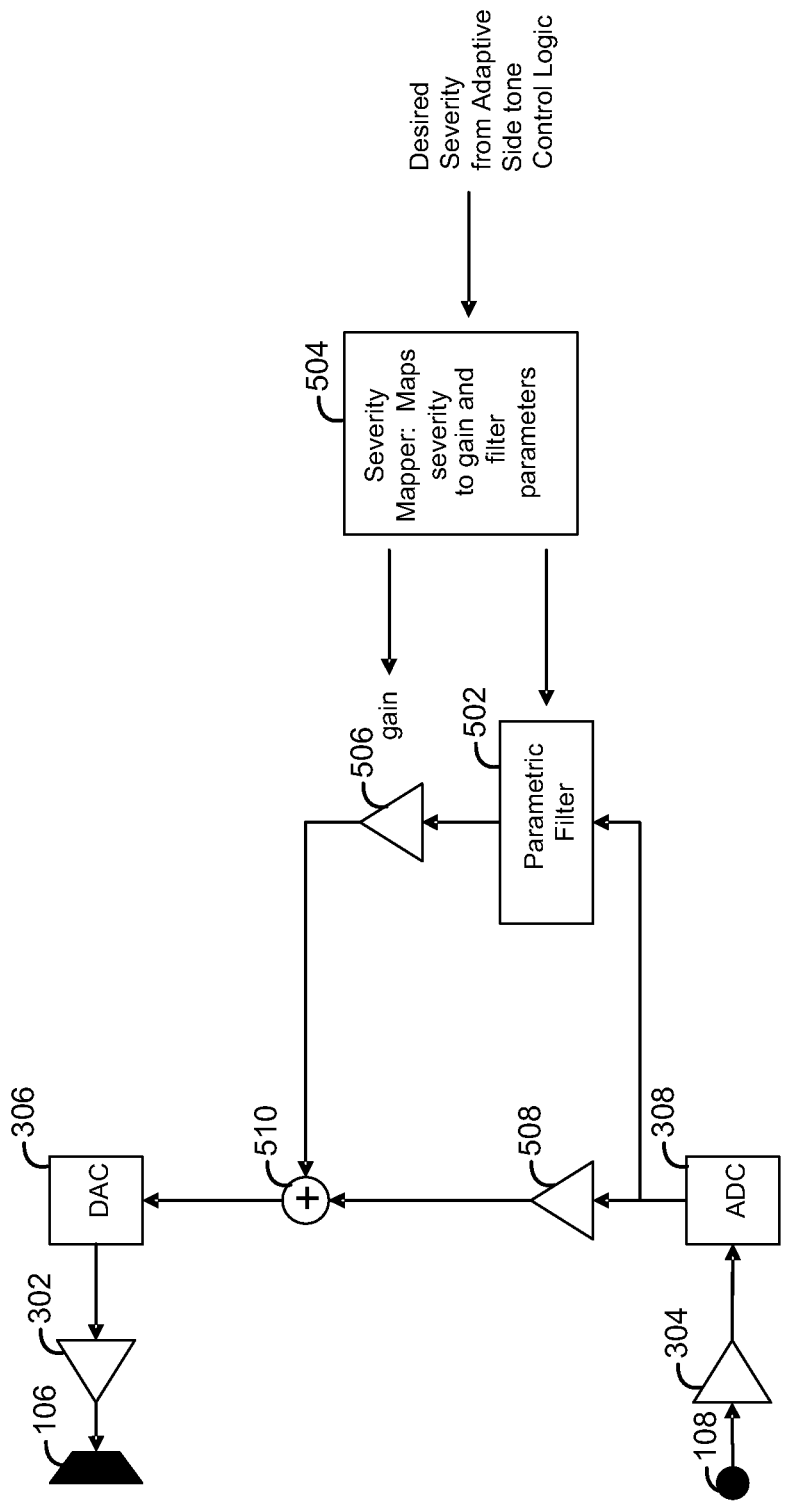
FIG. 5 is a block diagram of a more detailed example of a sound quality signal adjuster of the system of FIGS. 1 and 3.

FIG. 5 is a block diagram of a more detailed example of a sound quality signal adjuster of the system of FIGS. 1 and 3, e.g., the filter and/or level adjuster 326 of FIG. 3. In FIG. 5 elements of the signal adjuster 118 and/or the system 326 may include a parametric filter 502 and an amplifier 506, receiving information from a severity mapper 504 that provides an example of the adjustment selector 118. That is, the severity mapper 504 may determine a desired severity as shown in FIG. 4, e.g., based on sound quality metrics output from the sound quality monitor 116, the noise reduction logic 114, and/or the sidetone adaptation and control logic 324. The severity mapper 504 may then map the desired severity, e.g., to filter and/or gain parameters of the filter and/or level adjustment system 326, which is shown in FIG. 5 as including the parameteric filter 502 and an amplifier 506.

In FIG. 5, then, an amplifier 508 feeds digital samples from the ADC 308 as sidetone back to the DAC 306, through an adder 510 used to modify the sidetone with an output of the parametric filter 502 and the amplifier 506. Although this example illustrates sidetone being applied in the digital realm, it will be appreciate that sidetone also may be applied in the analog realm. In example implementations, the sidetone may provide, for example, a –20 B loss inserted into the receive path of the telephone system, which may be modified by the sound quality indicator 110 in the manner and extent as described herein, or as would be apparent.

Change in the filter parameters of the filter 502 and in the gain of the amplifier 506 may occur gradually with a slow time constant (e.g., 1 to 2 seconds), to avoid abrupt perceptual effects being noticed by the near-end user 102. The parametric filter 502 may be used to implement one or more predefined set of signals (e.g., pink noise mixed with a tone), where these signals and associated parameters may be stored for selection using the quality adjustment schemes memory 120. In practice, the parametric filter 502 may be implemented as a cascade of two or more filters, including a constant high pass filter to produce a strong base signal, as well as a parametric low pass filter, or other filter(s), as would be appropriate.

Figure 6:
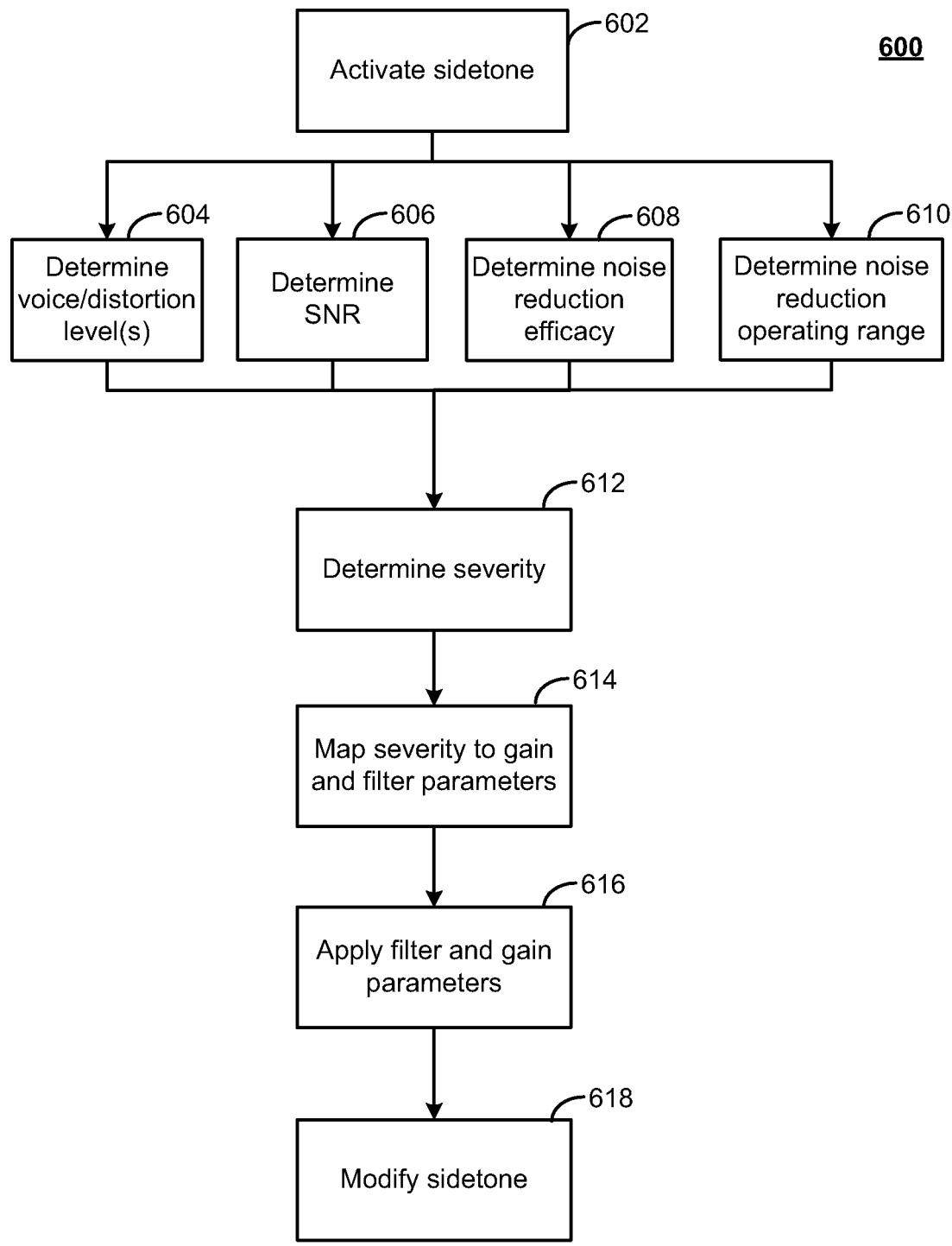
FIG. 6 is a flowchart illustrating additional example operations of the systems of FIGS. 1 and 3.

FIG. 6 is a flowchart 600 illustrating additional example operations of the systems of FIGS. 1 and 3. In the example of FIG. 6, sidetone may be activated (602) as part of a normal telephone conversation of the telephone systems of FIGS. 1 and/or 3. Then, various sound quality metrics may be collected, detected, or otherwise determined. For example, voice/distortion levels may be determined (604), e.g., as part of a voice activity detection (VAD) scheme. SNR may be determined or estimated (606), or a noise reduction efficacy may be determined (608), or an operation range of the noise reduction logic 114 may be determined (610). Of course, these sound quality metrics are merely examples, and other metrics, and/or subsets of the illustrated metrics, may be used Then, a severity may be determined (612), where, as explained, a larger severity may be necessary if distortion is particularly high, or when certain types of distortion are present (even at low levels), and/or the near-end user 102 speaks softly. In order to implement the desired level of severity, a mapping of the severity may be made to one or more filter and/or gain parameters (614), e.g., by the severity mapper 504. Once mapped, e.g., using the adjustment selection schemes 120, the filter and gain parameters may be applied (616). For example, filter parameters may be applied to the filter 502, and gain parameters may be applied to the amplifier 506. Finally, an output(s) of the filter 502 and the amplifier 506 may be combined with, or applied to, an output of the sidetone generator 112, e.g., including the amplifier 508, and using the adder 510.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
a sound quality monitor configured to determine a sound quality metric based on input received at a microphone of a near-end telephone system;
a sidetone generator configured to generate a sidetone signal based on the received input; and
a signal adjuster coupled to the sound quality monitor, the signal adjuster configured to generate a sound quality indication signal based on the sound quality metric, the sound quality indication signal being combined with the sidetone signal to form a feedback signal that alerts a user of the near-end telephone system to adjust the input to the microphone, the feedback signal being fed through an adder to combine with a received signal from a far-end telephone system.

2. The system of claim 1 wherein the sound quality metric includes a noise-related measurement.

3. The system of claim 1 wherein the sound quality monitor is configured to determine the sound quality metric from noise reduction logic associated with the near-end telephone system.

4. The system of claim 1 wherein the sound quality metric includes an efficacy of noise reduction logic associated with the microphone.

5. The system of claim 1 comprising a sound adjustment scheme memory configured to store adjustment schemes that are associated with one or more sound quality metrics, wherein the signal adjuster is configured modify the sidetone signal by corresponding the sound quality metric with one or more of the adjustment schemes.

6. The system of claim 1 further comprising an adjustment selector configured to provide the signal adjuster with filter parameters to parameterize a filter associated with the signal adjuster.

7. The system of claim 1 further comprising an adjustment selector configured to provide the signal adjuster with an extent of level adjustment, expressed as a gain, for modifying a level of an audio signal provided to the adder.

8. The system of claim 1 wherein:
the sound quality monitor is configured to monitor a digital signal resulting from an analog-to-digital converter configured to convert an analog signal received at the microphone, and the signal adjuster is configured to provide an audible indicator in a digital signal provided to a digital-to-analog converter for conversion into an analog audio signal provided at the adder.

9. The system of claim 1, wherein the sound quality metric including a measure of distortion.

10. The system of claim 1, wherein the sound quality metric includes a measure of wind-caused distortion relative to a signal strength of a voice received by the microphone.

11. The system of claim 1, wherein the sound quality indication signal includes an audible indicator by varying a volume of the sidetone signal fed to the adder in proportion to the sound quality metric.

12. The system of claim 1, wherein:
the sound quality metric includes a measure of wind-caused distortion; and
the signal adjuster is configured to provide an audible indicator via the sound quality indication signal by increasing a volume of the sidetone signal fed to the adder in response to an increasing amount of wind-caused distortion.

13. The system of claim 1, wherein the microphone includes a mouthpiece.

14. The system of claim 1, wherein the microphone is coupled to the sound quality monitor, and further comprising a speaker coupled to the adder.

15. The system of claim 1, wherein the adder is configured to send the combined signal to a speaker of the near-end telephone system.

16. The system of claim 1, wherein the signal adjuster is configured to modify the sidetone signal to feed an audio signal relating to a wind noise received at the microphone to the adder.

17. A microchip for a near-end telephone system, the microchip including a processor and a memory, the memory including instructions that, when executed by the processor, cause the near-end telephone system to:
determine a sound quality metric based on input received at a microphone of the near-end telephone system;
generate a sidetone signal based on the received input;
generate a sound quality indication signal based on the sound quality metric, the sound quality indication signal being combined with the sidetone signal to form a feedback signal that alerts a user of the near-end telephone system to adjust the input to the microphone; and
combine the feedback signal with a received signal from a far-end telephone system.

18. The microchip of claim 17 wherein the sound quality metric is obtained from noise rejection logic associated with the near-end telephone system.

19. The microchip of claim 17, wherein the instructions further cause the near-end telephone system to send the combined signal to a speaker of the near-end telephone system.

20. A method comprising:
determining a sound quality metric based on input received at a microphone of a near-end telephone system;
generating a sidetone signal based on the received input;
generating a sound quality indication signal based on the sound quality metric, the sound quality indication signal being combined with the sidetone signal to form a feedback signal that alerts a user of the near-end telephone system to adjust the input to the microphone; and
combining the feedback signal with a received signal from a far-end telephone system.

* * * * *